US011792150B2

(12) United States Patent
Sloane et al.

(10) Patent No.: US 11,792,150 B2
(45) Date of Patent: Oct. 17, 2023

(54) ELECTRONIC MAIL CONNECTEDNESS INDICATOR

(71) Applicant: BANK OF AMERICA CORPORATION, Charlotte, NC (US)

(72) Inventors: Brandon Sloane, Indian Land, SC (US); Julio Cesar Nunez, Denver, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 137 days.

(21) Appl. No.: 17/470,829

(22) Filed: Sep. 9, 2021

(65) Prior Publication Data

US 2023/0074369 A1    Mar. 9, 2023

(51) Int. Cl.
*H04L 51/216*    (2022.01)
*H04L 51/42*    (2022.01)
*G06Q 10/107*    (2023.01)
*H04L 9/40*    (2022.01)

(52) U.S. Cl.
CPC ........... *H04L 51/42* (2022.05); *G06Q 10/107* (2013.01); *H04L 51/216* (2022.05); *H04L 63/102* (2013.01); *H04L 63/1416* (2013.01)

(58) Field of Classification Search
CPC ..... H04L 51/42; H04L 51/216; H04L 63/102; H04L 51/16; H04L 51/22; H04L 63/1416; G06Q 10/107
USPC .......................... 709/220, 224, 225, 226, 227
See application file for complete search history.

(56) References Cited

U.S. PATENT DOCUMENTS

| 7,949,754 | B2 | 5/2011 | Lessman |
| 7,949,759 | B2 | 5/2011 | Appelman |
| 8,443,049 | B1* | 5/2013 | Geddes ................. H04L 63/126 709/208 |
| 9,847,973 | B1 | 12/2017 | Jakobsson et al. |
| 11,228,552 | B1* | 1/2022 | Venkatachalam ..... H04L 67/568 |
| 11,398,996 | B2* | 7/2022 | Muthuswamy ......... H04L 51/56 |
| 11,546,437 | B1* | 1/2023 | Bhushan ................. H04L 67/12 |
| 11,563,813 | B1* | 1/2023 | Bhushan ............... G06F 16/213 |
| 2003/0055962 | A1* | 3/2003 | Freund .................. H04L 63/145 709/225 |
| 2007/0038718 | A1* | 2/2007 | Khoo .................... H04L 51/046 709/206 |
| 2012/0204111 | A1* | 8/2012 | Paulino ................... H04L 51/48 715/733 |
| 2012/0296965 | A1* | 11/2012 | Srivastava ........... G06Q 10/107 709/204 |
| 2014/0109205 | A1* | 4/2014 | Lymer .................... G06Q 30/02 726/6 |
| 2014/0333958 | A1* | 11/2014 | Oshima .............. H04N 1/32797 358/1.15 |

(Continued)

FOREIGN PATENT DOCUMENTS

CA        3184142 A1 *  1/2022  ............. G06F 16/13

*Primary Examiner* — Khanh Q Dinh
(74) *Attorney, Agent, or Firm* — Moore & Van Allen PLLC; James C. Edwards

(57) ABSTRACT

Enhancing the security of emails by providing the user an indicator within an email and/or an email inbox that indicates a level of connectedness between the user/recipient to the email sender and/or a level of trust that the email has been sent from who it purports to be sent from. As such the present invention provides a highly efficient means by which email users can assess their connectedness to the email sender and/or their trust in the email sender.

16 Claims, 5 Drawing Sheets

(56) References Cited

U.S. PATENT DOCUMENTS

| | | | |
|---|---|---|---|
| 2015/0282381 A1* | 10/2015 | Yampolsky | H05K 7/20127 165/185 |
| 2016/0138790 A1* | 5/2016 | Peterson | G02B 6/0063 362/23.19 |
| 2016/0203742 A1* | 7/2016 | Peterson | H04N 23/60 362/23.19 |
| 2018/0220044 A1* | 8/2018 | Chandrasekaran | H04N 1/00538 |
| 2019/0245894 A1* | 8/2019 | Epple | G06F 21/56 |
| 2020/0167786 A1 | 5/2020 | Kursun | |
| 2020/0167787 A1 | 5/2020 | Kursun | |

* cited by examiner

ELECTRONIC MAIL CONNECTEDNESS INDICATOR

FIELD OF THE INVENTION

The present invention is generally electronic communications and, more specifically, enhancing the security of electronic mail (email) though use of a connectedness and/or trust indicator that indicate the level of connectedness and/or trust that user has in the sender or receiver of the email.

BACKGROUND

The volume of email that a user receives in their inbox continues to increase. This ever-increasing volume makes it difficult for the user to manage their email account. While, filters may be implemented to catch email that is irrelevant to or unwanted by the user, senders of such "junk" email tend to be one-step ahead and, thus, devise ways to avoid the filters. Additionally, in larger enterprises, the user of a business email account can be inundated with valid emails sent from colleagues, clients or the like. However, unless the sender makes an appropriate designation, the user has no easy means by which to assess which of the emails demand the user's immediate attention and which of the emails can be given a lower priority. This is especially evident if the user does not immediately recognize the email address of the sender (i.e., the individual or entity sending the email).

Additionally, wrongdoers have devised ways to impersonate (i.e., spoof) email addresses as a means for attempting to gain personal information from users. In this regard, the user may receive an email from an email address that the user is familiar with; however, the email address has been compromised, and the actual sender of the email is a wrongdoer trying to impersonate the rightful possessor of the email address. In such instances, the unknowing user/recipient, who assumes that the sender is the rightful possessor of the email address, may easily be coerced into responding to the email. Thus, the user has no guarantee that the sender is who they purport to be.

Therefore, a need exists to assist in the management of email and enhance the security afforded email. In this regard, a need exists for user's to be able to readily identify which emails they receive are from individuals or entities that are highly connected to the user. Emails from highly connected individuals and entities are typically more important and, thus, demand a user's attention as opposed to those emails from less connected individuals or entities. Moreover, a need exists for user's to be able to readily assess the trustworthiness of an email in terms of both the connectedness to the individual or entity sending the email and the degree of security threat surrounding the email address/domain or the like. By being able to immediately assess the validity (i.e., trustworthiness) of an email, the user/recipient can make quick and decisive decisions on whether to read or act on an email.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for an indicator within an email or an email inbox that indicates the level of connectedness of the sender of an email to the user/recipient and, in some embodiments, the level of trust that the user/recipient has that the sender of the email is who they purport to be. In this regard, the connectedness indicator provides an easy means by which the user/recipient can gauge the significance and/or importance of the email in terms of how connected they are to the sender. Similarly, the trust indicator provides an easy means by which the user/recipient can be assured that the sender is who they purport to be and not a wrongdoer.

In specific embodiments of the invention, receipt of an email by a user prompts access of the user's historical electronic communication records (e.g., historical emails, text messages, instant messages (IMs), direct messages (DMs), voice mail or the like) to determine the level of connectedness of the sender to the user/recipient. Connectedness may be based on the volume of such historical electronic communications, the timing/currency of the electronic communications, the type of electronic communications and/or the subject matter of the electronic communications. Moreover, in other specific embodiments of the invention, receipt of the email by a user prompts access to one or more threat monitoring systems/application to determine the level of trust/threat surrounding the email address of the sender. Based on the determined level of connectedness and, in some embodiments, the level of the trust, an indicator is appended to the email or included within the email inbox that indicates the level of connectedness to the email sender and/or level of trust in the email sender.

A system for enhancing the security of electronic mail defines first embodiments of the invention. The system includes one or more communication storage apparatus including a first memory and at least one first processing device in communication with the first memory. The first memory is configured to store historical electronic communication sent and received by a plurality of users. In addition, the system includes a computing platform having a second memory and at least one second processing device in communication with the second memory. Th second memory stores a connectedness indicator module, executable by the at least one second processing device and configured to receive an email sent by an individual or entity and addressed to a user from amongst the plurality of users, access the first memory of the one or more communication storage apparatus to determine a volume of electronic communication (i) received by the user from the individual or entity, and (ii) sent to the individual or entity by the user. The connectedness indicator module is further configured to determine a level of connectedness that the user has to the individual or entity based at least on the determined volume of electronic communication, and provide an indicator within at least one of (i) the email, and (ii) an electronic mailbox of the user that indicates the level of connectedness that the user has to the individual or entity.

In specific embodiments of the system, the connectedness indicator module is further defined as a trust indicator module that is further configured to access one or more electronic communication threat monitoring applications to determine whether security threats are attributed to the individual or entity that sent the email, and determine a level of trust that the user has with the individual or entity based at least on the determined (i) volume of electronic communication, and (ii) whether security threats are attributed to the individual or entity, and, if security threats are attributed to the individual or entity, a volume and type of the security threats. Further, the trust indicator module is configured to provide the indicator within at least one of (i) the email, and (ii) the electronic mailbox of the user that indicates the level of trust that the user has with the individual or entity.

In other specific embodiments of the system, the first memory of the one or more communication storage apparatus is configured to store the historical electronic communication including at least one selected from the group consisting of email, direct message, Short Messaging Service (SMS)/text message and voice mail. In such embodiments of the system, the connectedness indicator module is further configured to access the first memory of the one or more communication storage apparatus to determine a volume of the at least one selected from the group consisting of email, direct message, Short Messaging Service (SMS)/text message and voice mail (i) received by the user from the individual or entity and (ii) sent to the individual or entity by the user.

In additional specific embodiments of the system, the second memory further stores a connectedness dashboard application, executable by the one or more second processing devices and configured to provide the user a dashboard presentation of information related to electronic communications comprising the volume of electronic communication. In such embodiments of the system, the dashboard presentation may be accessible to the user via a hyperlink embedded in the indicator. In other related embodiments of the system, in which the connectedness indicator module is further defined as a trust indicator module, the second memory further stores a trust dashboard application, executable by the one or more second processing devices and configured to provide the user a dashboard presentation of information related to (i) electronic communications comprising the volume of electronic communication and (ii) the one or more security threats associated with the individual or entity.

In other specific embodiments of the system, the connectedness indicator module is an application programming interface (API) that connects to an email client.

In still further embodiments of the system, the connectedness indicator module is further configured to receive, within a header of an email to be sent by the user, an email address associated with a second individual or second entity, and access the first memory of the one or more communication storage apparatus to determine a volume of electronic communication (i) received by the user from the second individual or second entity and (ii) sent to the second individual or second entity by the user. In such embodiments of the system, the connectedness indicator module is further configured to determine a level of connectedness that the user has to the second individual or second entity based at least on the determined volume of electronic communication, and provide an indicator to the user that indicates the level of connectedness that the user has to the second individual or second entity.

Moreover, in additional specific embodiments of the system, the indicator comprises at least one of a heat map and a bar graph that indicates the level of connectedness that the user has to the individual or entity.

In further specific embodiments of the system, the connectedness indicator module is further configured to assign a weighting value to electronic communications comprising the volume of the electronic communications based at least on one or more of (i) a type of electronic communication, (ii) a time of the electronic communication and/or (iii) a subject of the electronic communication. In such embodiments of the system, determining the level of connectedness that the user has to the individual or entity is further based on weighted values assigned to electronic communications comprising the volume of the electronic communications.

In additional specific embodiments of the system, the connectedness indicator module is further configured to access the first memory of the one or more communication storage apparatus to determine a volume of electronic communication (iii) received by other users included within the plurality of users from the individual or entity and (iv) sent to the individual or entity by the other users. The other users are defined by at least one of (a) having a same role as the user, (b) belonging to a same group as the user, (c) belonging to a same enterprise as the user. The connectedness indicator module is further configured to determine the level of connectedness that the user has to the individual or entity based at least on the determined volume of electronic communication (i) received by the user from the individual or entity, (ii) sent to the individual or entity by the user, (iii) received by the other users from the individual or entity and (iv) sent to the individual or entity by the other users.

In further specific embodiments of the system, the connectedness indicator module is further configured to access the first memory of the one or more communication storage apparatus to determine at least one type of communication for each electronic communication in the volume of electronic communications. The types of communication include (i) business, (ii) personal, (iii) client and (iv) service. In such embodiments of the system, the connectedness indicator module is further configured to determine one or more levels of connectedness that the user has to the individual or entity based at least on the volume of electronic communication (i) received by the user from the individual or entity and (ii) sent to the individual or entity by the user. Each of the one or more levels of connectedness are associated with one of the types of communication. Further the connectedness indicator module is configured to provide one or more indicators within at least one of (i) the email, and (ii) the electronic mailbox of the user that indicates the level of connectedness that the user has to the individual or entity. Each of the one or more indicators is associated with one of the types of communication.

A computer-implemented method for enhancing the security of electronic mail, defines second embodiments of the invention. The computer-implemented method is executed by one or more processing devices. The computer-implemented method includes receiving an email sent by an individual or entity and addressed to a user and, in response, accessing historical electronic communications sent or received by the user to determine a volume of electronic communication (i) received by the user from the individual or entity and (ii) sent to the individual or entity by the user. In addition, the method includes determining a level of connectedness that the user has to the individual or entity based at least on the determined volume of electronic communication, and providing an indicator within at least one of (i) the email, and (ii) an electronic mailbox of the user that indicates the level of connectedness that the user has to the individual or entity.

In specific embodiments the method further includes accessing one or more electronic communication threat monitoring applications to determine whether security threats are attributed to the individual or entity that sent the email, and determining a level of trust that the user has with the individual or entity based at least on the determined (i) volume of electronic communication, and (ii) whether security threats are attributed to the individual or entity, and, if security threats are attributed to the individual or entity, a volume and type of the security threats. In such embodiments of the method, providing the indicator further includes providing the indicator within at least one of (i) the email, and (ii) the electronic mailbox of the user that indicates the level of trust that the user has with the individual or entity.

In other specific embodiments the computer-implemented method includes providing the user a dashboard presentation of information related to (i) electronic communications comprising the volume of electronic communication, and (ii) security threats that are attributed to the individual or entity. In specific embodiments of the computer-implemented method, providing the user a dashboard application includes providing the user the dashboard application via a hyperlink embedded in the indicator.

In other specific embodiments the computer-implemented method further includes accessing the first memory of the one or more communication storage apparatus to determine a volume of electronic communication (iii) received by other users included within the plurality of users from the individual or entity, and (iv) sent to the individual or entity by the other users. The other users are defined by at least one selected from the group consisting of (a) having a same role as the user, (b) belonging to a same group as the user, (c) belonging to a same enterprise as the user. In addition such embodiments of the computer-implemented method include determining the level of connectedness that the user has to the individual or entity based at least on the determined volume of electronic communication (i) received by the user from the individual or entity, (ii) sent to the individual or entity by the user, (iii) received by the other users from the individual or entity and (iv) sent to the individual or entity by the other users.

A computer program product including a non-transitory computer-readable medium defines third embodiments of the invention. The non-transitory computer-readable medium includes a first set of codes for causing a computer to receive an email sent by an individual or entity and addressed to a user. Additionally, the computer-readable medium includes a second set of codes for causing a computer to access historical electronic communications sent or received by the user to determine a volume of electronic communication (i) received by the user from the individual or entity and (ii) sent to the individual or entity by the user. Further, the computer-readable medium includes a third set of codes configured to cause a computer to determine a level of connectedness that the user has to the individual or entity based at least on the determined volume of electronic communication, In addition, the computer-readable medium includes a fourth set of codes for providing an indicator within at least one of (i) the email, and (ii) an electronic mailbox of the user that indicates the level of connectedness that the user has to the individual or entity.

In specific embodiments of the computer program product, the computer-readable medium includes a fifth set of codes for causing a computer to access one or more electronic communication threat monitoring applications to determine whether security threats are attributed to the individual or entity that sent the email, and a sixth set of codes for causing a computer to determine a level of trust that the user has with the individual or entity based at least on the determined (i) volume of electronic communication, and (ii) whether security threats are attributed to the individual or entity, and, if security threats are attributed to the individual or entity, a volume and type of the security threats. In such embodiments of the computer program product, the fourth set of codes is further configured to cause the computer to provide the indicator within at least one of (i) the email, and (ii) the electronic mailbox of the user that indicates the level of trust that the user has with the individual or entity.

In still further specific embodiments of the computer program product, the computer-readable medium includes a fifth set of codes for causing a computer to provide the user, via a hyperlink embedded in the indicator, a dashboard presentation of information related to (i) electronic communications comprising the volume of electronic communication, and (ii) security threats that are attributed to the individual or entity.

Thus, according to embodiments of the invention, which will be discussed in greater detail below, the present invention addresses needs and/or achieves other advantages by providing the user an indicator, such as a visual indicator, within an email or an email inbox that indicates a level of connectedness of the user to the email sender and/or a level of trust that the email has been sent from who it purports to be sent from (i.e., the email address is valid). As such the present invention provides a highly efficient means by which email users can assess their connectedness to the email sender and/or their trust in the email sender. Thus, the present invention enhances the management of emails and security surrounding emails.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
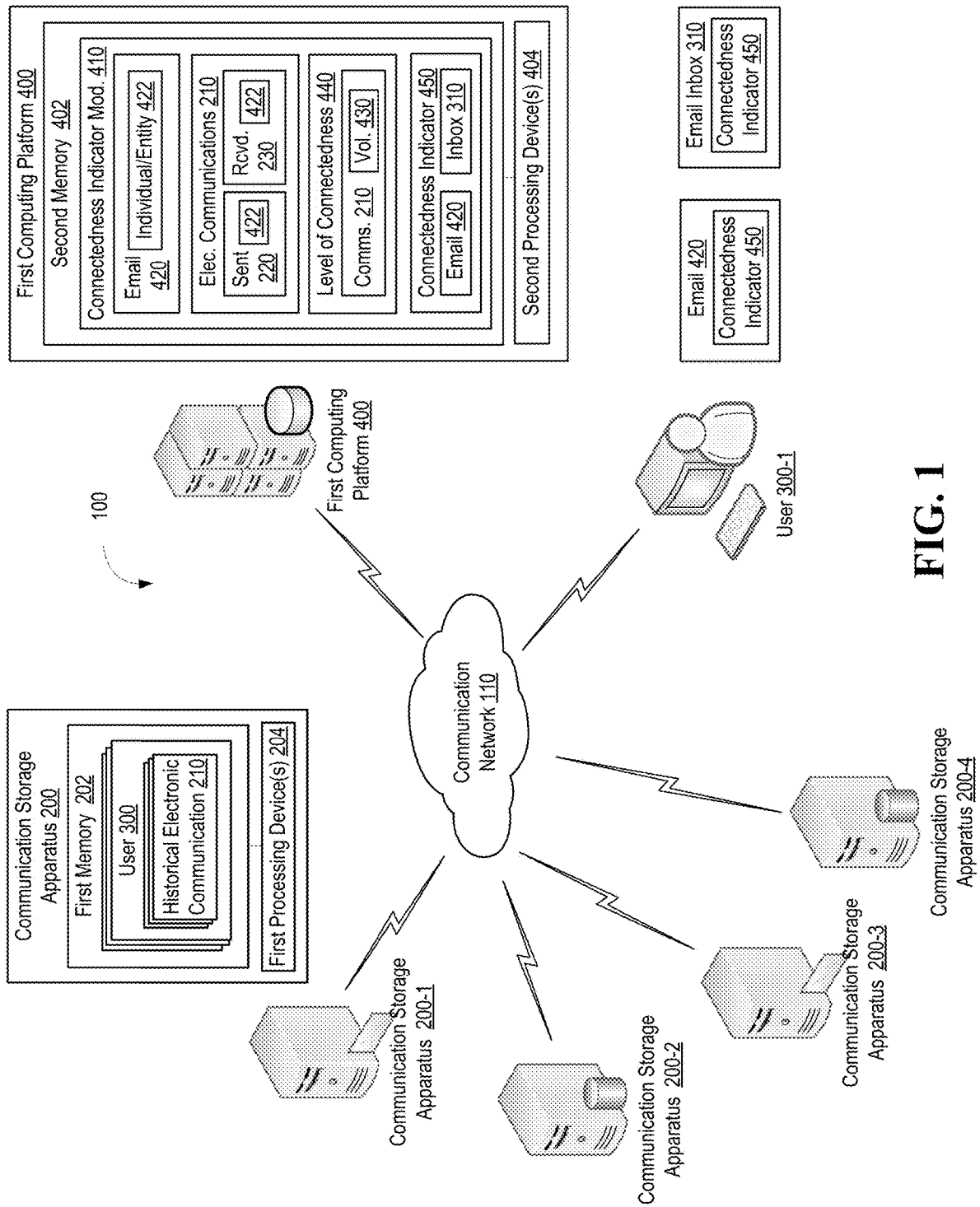
Figure 2:
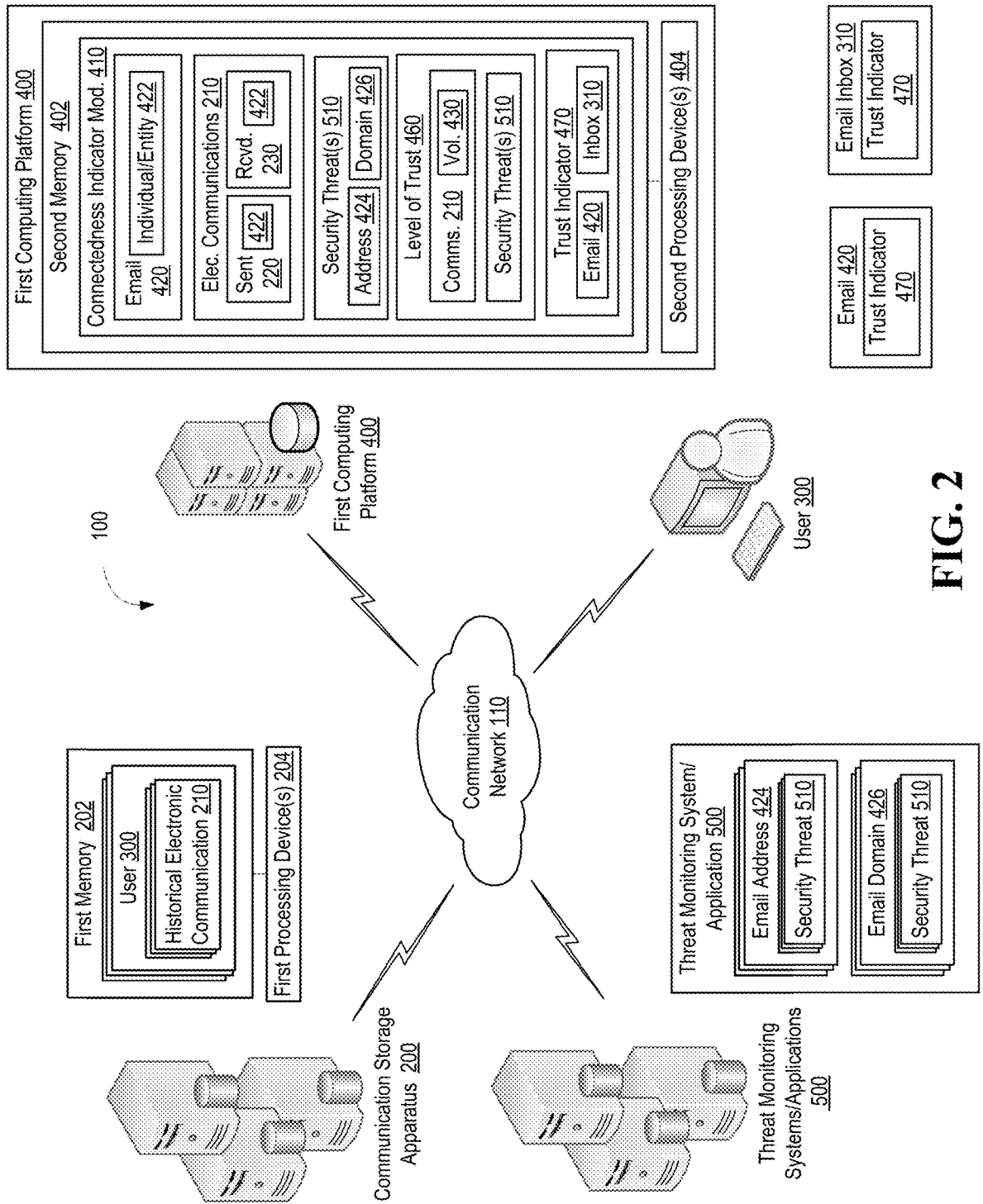
Figure 3:
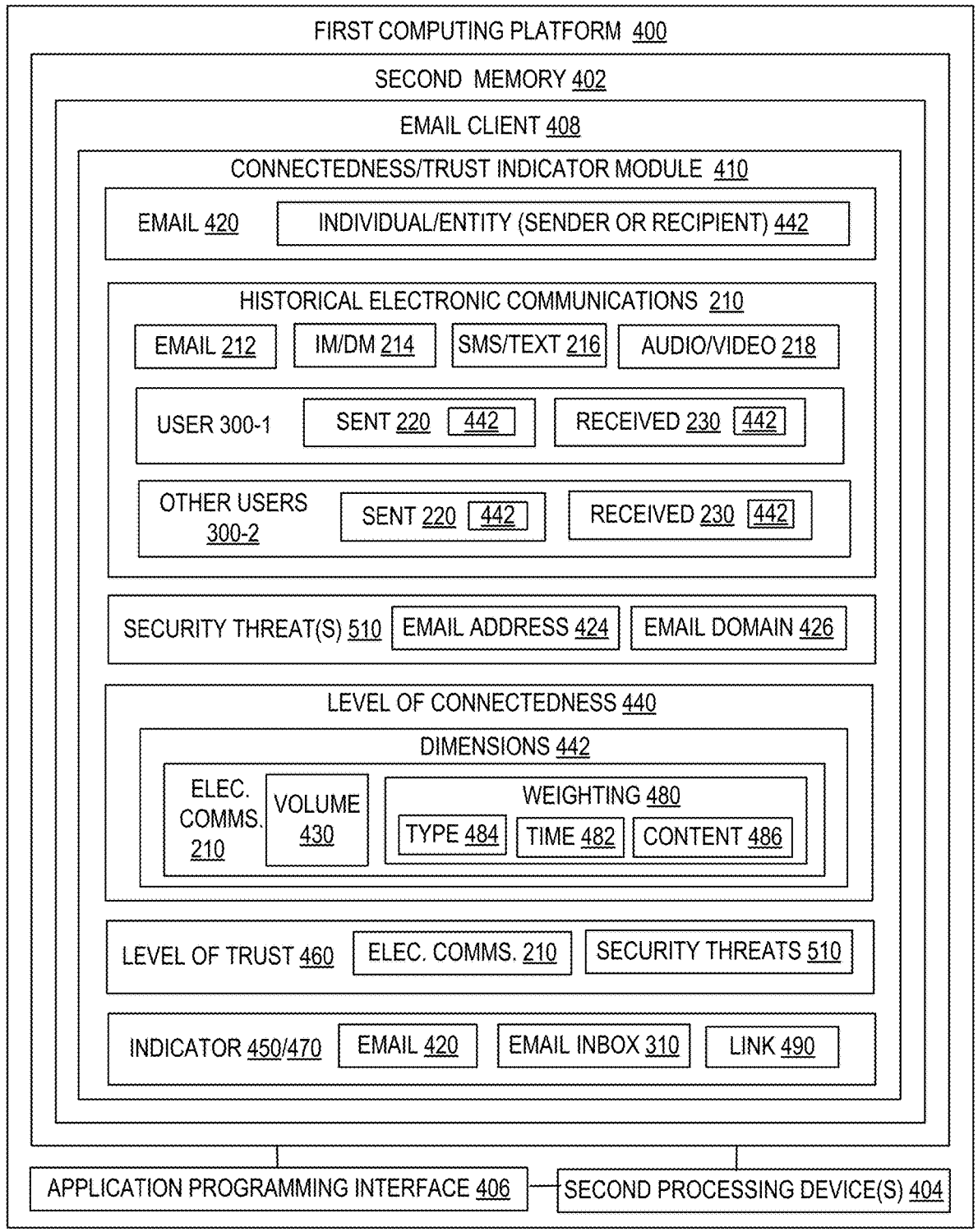
Figure 4:
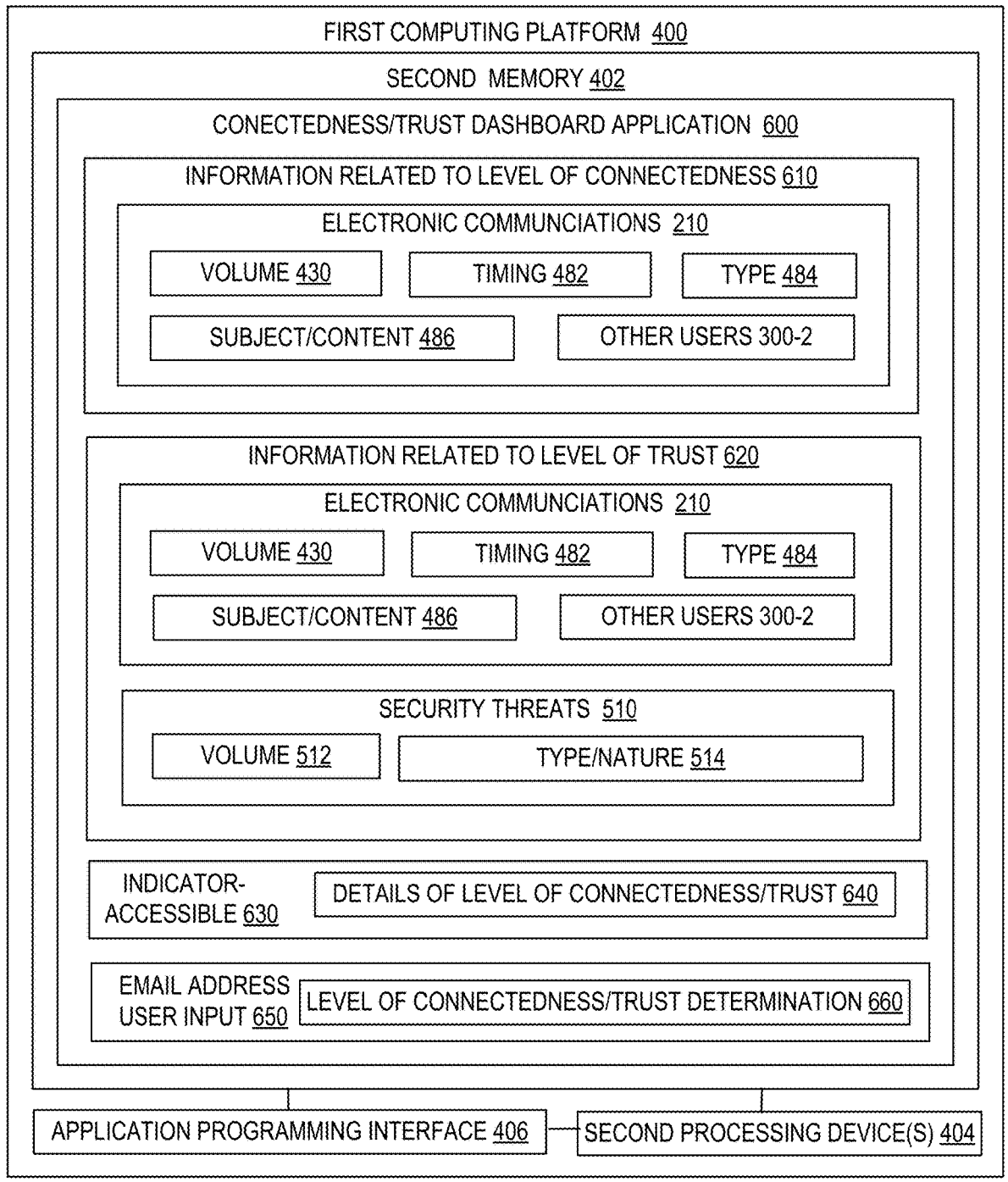
Figure 5:
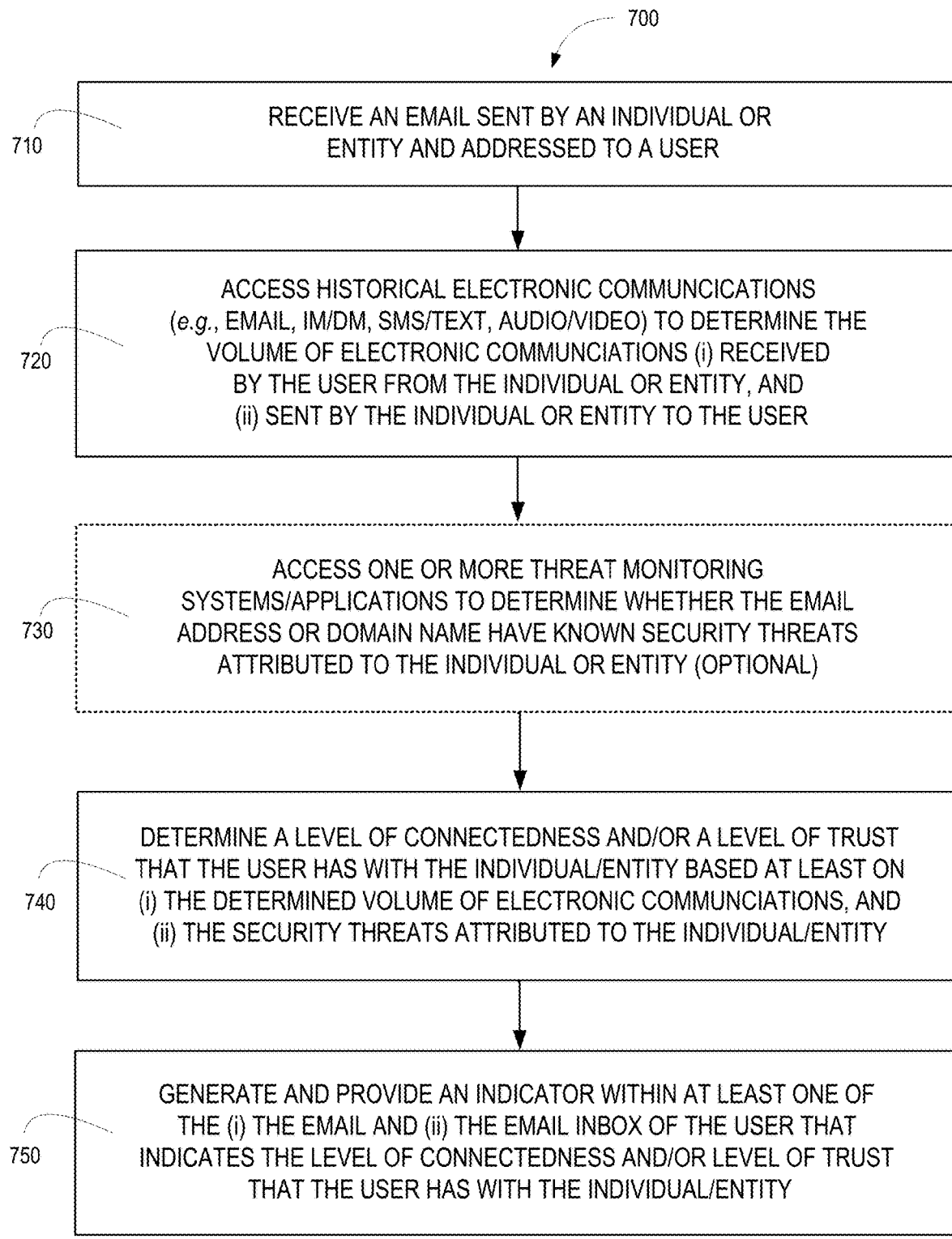

Having thus described embodiments of the disclosure in general terms, reference will now be made to the accompanying drawings, wherein:

FIG. 1 is a schematic/block of a system for providing an indicator, within an email and/or an email inbox, of a user's connectedness to an email sender, in accordance with embodiments of the present invention;

FIG. 2 is a schematic/block diagram of an enhancing security of email by providing for an indicator, within email and/or an email inbox, of a user's level of trust/veracity in the email sender, in accordance with embodiments of the present invention;

FIG. 3 is a block diagram of a computing platform configured for generating indicators within email and/or email inboxes that indicate a level of connectedness to and/or trust/veracity in the email sender, in accordance with alternate embodiments of the present invention;

FIG. 4 is a block diagram of a computing platform configured for presenting a connectedness/trust dashboard, in accordance with embodiments of the present invention; and FIG. 5 is flow diagram of a method for enhancing security in email by providing for indicators within email and/or email inboxes that indicate a level of connectedness to and/or trust/veracity in the email sender, in accordance with alternate embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for generating an indicator, such as a visual indicator or the like, within an email or an email inbox that indicates the level of connectedness of the sender of an email to the user/recipient and, in some embodiments, the level of trust that the user/recipient has that the sender of the email is who they purport to be. In this regard, the connectedness indicator provides an easy means by which the user/recipient can gauge the significance and/or importance of the email in terms of how connected they are to the sender. Similarly, the trust indicator provides an easy means by which the user/recipient can be assured that the sender is who they purport to be and not a wrongdoer.

In specific embodiments of the invention, receipt of an email by a user prompts access of the user's historical electronic communication records (e.g., historical emails, text messages, instant messages (IMs), direct messages (DMs), voice mail or the like) to determine the level of connectedness of the sender to the user/recipient. Connectedness may be based on the volume of such historical electronic communications, the timing/currency of the electronic communications, the type of electronic communications and/or the subject matter of the electronic communications. In addition, according to other embodiments of the invention, connectedness may be based historical electronic communications received or sent by other user's associated with the user/recipient, such as other user's within a same group or enterprise of the user/recipient, other user's with the same role/title as the user/recipient and the like. Additionally, other embodiments of the invention may provide for various dimensions of connectedness with each dimension having a specific indicator. Dimensions of connectedness may be based on the type of relationship that the user has with the sender or the type/contents of the historical electronic communications. For example, a business relationship or business electronic communication content may define one dimension, while a personal relationship or personal electronic communication content may define another dimension and the like.

Moreover, in other specific embodiments of the invention, receipt of the email by a user prompts access to one or more threat monitoring systems/application to determine current security threats surrounding the email address, the domain name or the like (i.e., the level of trust/threat surrounding the individual or entity that sent the email).

Based on the determined level of connectedness and, in some embodiments, the level of the trust, an indicator (e.g., a visual indicator, such as a heat map, a bar graph, score or the like or an audible indicator) is generated and appended to the email or included within the email inbox that indicates the level of connectedness to the email sender and/or level of trust in the email sender.

Referring to FIG. 1, a schematic diagram is presented of an exemplary system 100 for enhancing the security of emails through indicators provided within emails or email inboxes that indicate the user's/email recipient's connectedness to the individual or entity that sent the email, in accordance with embodiments of the present invention. The system 100 is implemented across a distributed communication network 110, which may include the Intranet, one or more intranets, one or more cellular networks or the like. As depicted, the system 100 includes a plurality of communication storage apparatus 200-1, 200-2, 200-3 and 200-4, such as servers or the like, that include first memory 202 and one or more first processing devices 204 in communication with the first memory 202. First memory 202 stores historical electronic communication 210 sent and received by a plurality of users 300. For example, each of the communication storage devices 200-1-200-4 may store a different type of electronic communication 210, such as electronic mail (i.e., email), direct messages (DMs), instant messages (IMs), voice/audio/multimedia messages or the like.

System 100 additionally includes first computing platform 400, which may comprise an application server or the like, having a second memory 402 and one or more second processing device(s) 404 in communication with second memory 402. Second memory 402 stores connectedness indicator module 410 that is executable by at least one of the one or more second processing device(s) 404. In specific embodiments of the system 100, connectedness indicator module 410 is an application programming interface (API) that connects to a commercially-available email client, such as Microsoft Outlook®, available from the Microsoft Corporation of Redmond, Washington. Connectedness indicator module 410 is configured to receive an email 420 sent by an individual or entity 422 and addressed to a user 300-1 from amongst the plurality of users 300. The email 420 is received and subsequent connectedness indicator processing is performed prior to the email 420 being sent to the user's email inbox 310.

In response to receipt of the email 420, connectedness indicator module 410 is configured to access the first memory 202 of one or more of the communication storage apparatus 200-1-200-4 to determine/identify historical electronic communication 210 (i) received 230 by the user 300-1 from the individual/entity 422, and (ii) sent to the individual/entity 422 by the user 300-1. According to specific embodiments of the system 100, the connectedness indicator module 410 is configured to determine the volume/quantity 430 of historical electronic communication 210 (i) received 230 by the user 300-1 from the individual/entity 422, and (ii) sent to the individual/entity 422 by the user 300-1. The volume 430 may be confined to a specific period of time (e.g., last five years) or the time period may extend throughout the use period of the email account by the user 300-1.

Connectedness indicator module 410 is further configured to determine a level of connectedness 440 that the user 300-1 has to the individual/entity 422 based at least on the volume 430 of electronic communications 210 (i) received 230 by the user 300-1 from the individual/entity 422, and (ii) sent to the individual/entity 422 by the user 300-1. As discussed at length infra., other factors may be taken into consideration in determining the level of connectedness, such as the timing of the electronic communications, the type of electronic communication (e.g., email, DM, IM or the like, one-off communications versus a chain of communications and the like), the subject of the electronic communications (as determined from the header or, in some embodiments, as determined from the body/contents of the communication). Additionally, the level of connectedness 440 may be determined based on secondary connectedness, i.e., electronic communications between the individual/entity 422 and other users from amongst the plurality of users 300, such as users with the same role/responsibilities/title as the user 300-1, users belonging to the same group as the user 300-1, users within the same division or enterprise as the user 300-1 or the like.

In response to determining the level of connectedness 440, connectedness indicator module 410 is further configured to generate and provide, within the email 420 and/or the email account inbox 310, a connectedness indicator 450 that indicates the level of connectedness 440 between the user/recipient 300-1 and the individual/entity 442. The indicator 450 may be a visual indicator, such as heat map, bar graph or the like that is color-coded to indicate the level of connectedness 440 or a score (e.g., ranging from 0-100 or the like). In alternate embodiments of the invention, the indicator may be configured, by the user or based on the platform that presenting the email, to be an audible indicator indicating the level of connectedness 440.

Referring to FIG. 2, a block diagram is presented of an alternate system 102 for enhancing the security of emails through indicators provided within emails or email inboxes that indicate the trustworthiness/veracity of the individual or entity that sent the email, in accordance with embodiments of the present invention, in accordance with embodiments of the present invention. As discussed in relation to FIG. 1, system 100 includes a plurality of communication storage apparatus 200, such as servers or the like, that are configured to store different types of electronic communication 210, such as electronic mail (i.e., email), direct messages (DMs), instant messages (IMs), voice/audio/multimedia messages or the like.

Additionally, system 100 includes one or more threat monitoring systems/applications 500 that are configured to detects security threats 510 associated with an email address 424, an email domain 426 or, in some embodiments, security threats 510 associated with the individuals/entities. For example, the email address 424 or email domain 426 may have been comprised by a wrongdoer, such that, the email address 424 or email domain 426 is known to be used for purposes of attempting to acquire a user's personal information (e.g., addresses, phone numbers, accounts numbers, social security numbers and the like).

System 102 additionally includes first computing platform 400 having a second memory 402 and one or more second processing devices 404 in communication with the second memory 402. Second memory 402 stores connectedness/trust indicator module 410 that is executable by at least one of the one or more second processing device(s) 404. Connectedness indicator module 410 is configured to receive an email 420 sent by an individual/entity 422 and addressed to a user 300-1 from amongst the plurality of users 300.

In response to receiving the email 420, connectedness/trust indicator module 410 is configured to access the first memory 202 of one or more of the communication storage apparatus 200 to determine/identify historical electronic communication 210 (i) received 230 by the user 300-1 from the individual/entity 422, and (ii) sent to the individual/entity 422 by the user 300-1. According to specific embodiments of the system 100, the connectedness indicator module 410 is configured to determine the volume/quantity 430 of historical electronic communication 210 (i) received 230 by the user 300-1 from the individual/entity 422, and (ii) sent to the individual/entity 422 by the user 300-1.

In further response to receiving the email 420, the connectedness/trust indicator module 410 is configured to access the threat monitoring systems/applications 500 to determine whether security threats 510 are attributed to the individual/entity 422, the email address 424 and/or email domain 426 and, if so, the volume of the security threats and the type/nature of the security threats.

Connectedness/trust indicator module 410 is further configured to determine a level of trust 460 that the user 300-1 has with the individual/entity 422 (i.e., a level of certainty that the individual/entity is who they purport to be) based at least on the volume 430 of electronic communications 210 (i) received 230 by the user 300-1 from the individual/entity 422, and (ii) sent to the individual/entity 422 by the user 300-1 and security threats 510 associated with the individual/entity 424 the email address 424, the email domain name 426 and the like. Similar to the embodiments discussed in relation the system 100 of FIG. 1, other factors may be taken into consideration in determining the level of trust 460, such as the timing of the electronic communications, the type of electronic communication (e.g., email, DM, IM or the like, one-off communications versus a chain of communications and the like), the subject of the electronic communications (as determined from the header or, in some embodiments, as determined from the body/contents of the communication) and other security-related data.

In response to determining the level of trust 460, connectedness/trust indicator module 410 is further configured to generate and provide, within the email 420 and/or the email account inbox 310, a trust indicator 470 that indicates the level of trust 440 that the user/recipient 300-1 in the individual/entity 442 being who they purport to be. The indicator 470 may be a visual indicator, such as heat map, bar graph or the like that is color-coded to indicate the level of trust 460 or a score (e.g., ranging from 0-100 or the like). In alternate embodiments of the invention, the indicator may be configured, by the user or based on the platform that presenting the email, to be an audible indicator indicating the level of trust 460.

Referring to FIGS. 3 and 4, block diagrams are depicted of first computing platform 400, in accordance with embodiments of the present invention. In addition to providing greater detail, FIGS. 3 and 4 highlight various alternate embodiments of the invention. First computing platform 400 comprises one or more computing devices/apparatus, such as servers or the like configured to execute software programs, including instructions, engines, algorithms, modules, routines, applications, tools, and the like. First computing platform 400 includes second memory 402, which may comprise volatile and non-volatile memory, EPROM, EEPROM, flash cards, or any memory common to computer platforms. Moreover, second memory 402 may comprise cloud storage, such as provided by a cloud storage service and/or a cloud connection service.

Further, first computing platform 400 also includes second processing device(s) 404, which may be an application-specific integrated circuit ("ASIC"), or other chipset, logic circuit, or other data processing device. Second processing device 404 may execute an application programming interface ("API") 406 that interfaces with any resident programs, such as connectedness/trust indicator module 410 and algorithms, sub-engines/routines associated therewith or the like stored in the second memory 402 of first computing platform 500.

Second processing device(s) 404 may include various processing subsystems (not shown in FIGS. 3 and 4) embodied in hardware, firmware, software, and combinations thereof, that enable the functionality of first computing platform 400 and the operability of first computing platform 400 on a distributed communication network 110 (shown in FIGS. 1 and 2). For example, processing subsystems allow for initiating and maintaining communications and exchanging data with other networked devices. For the disclosed aspects, processing subsystems of second processing device(s) 404 may include any subsystem used in conjunction with connectedness/trust indicator module 410 and the connectedness/trust dashboard application 600 and related engines, routines, algorithms, sub-algorithms, modules, sub-modules thereof.

First computing platform 400 additionally includes a communications module (not shown in FIGS. 3 and 4) embodied in hardware, firmware, software, and combinations thereof, that enables electronic communications between first computing platform 400 and other networks and/or networked devices, such as, communication storage apparatus 200, user 300 workstations, threat monitoring systems/application 500 and the like. Thus, the communication module may include the requisite hardware, firmware, software and/or combinations thereof for establishing and maintaining a network communication connection with one or more systems, platforms, networks, or the like.

As previously discussed in relation to FIGS. 1 and 2, second memory 402 stores connectedness/trust indicator module 410 that is executable by the processing device(s) 404 and configured to generate and present a connectedness/trust indicator 450/470 within an email 420 or email inbox 310. Specifically, connectedness/trust indicator module 410 is configured to receive an email 420 sent from or to an individual/entity 442. As previously discussed, the email 420 may be received from an individual/entity 442 and subsequent connectedness/trust determination may be performed prior to placing the email 420 in the user's inbox 310. In other embodiments of the invention, a user may address an email (i.e., enter an email address 424 in the email header) and, once entered, the user may provide an input (e.g., right click and select, hover over the email address or the like) that prompts the subsequent determination of the connectedness/trust in the individual/entity 442 associated with the email address.

In response to receiving the email 420 or email address 424, connectedness/trust indicator module 410 is configured to access one or more communication storage devices 200 (shown in FIGS. 1 and 2) to determine, at least, a volume 430 of historical electronic communications 210 (i) received 230 by the user 300-1 from the individual/entity 442 and (ii) sent 220 to the individual/entity by the user 300-1. The historical electronic communications 210 may include, but are not limited to, email 212, IM/DM 214, SMS/text 216, audio/video communications 218 and the like.

In addition to determining the volume 430 of historical communications 210 between the user 300-1 and the individual/entity 442, connectedness/trust indicator module 410 is configured to determine a volume 430 of from the individual/entity 442 and (ii) sent 220 to the individual/entity by other users 300-2, and (ii) sent 220 to the individual/entity by the other user 300-2. The other users 300-2 are users connected to the user 300-1, such as members of the same group, individuals in the same organization/enterprise, individuals with the same role/title and the like.

In specific embodiments of the invention, connectedness/trust indicator module 410 is further configured to access one or more threat monitoring systems/applications 500 (shown in FIG. 2) to identify whether any security threats 510 exist for the email address 424 and/or the email domain 426. The threat monitoring systems/applications may be internal applications/systems or external/third-party applications/systems.

Connectedness/trust indicator module 410 is further configured to determine a level of connectedness 440 and/or, in some embodiments, a level of trust 460. The level of connectedness is determined based, at least on, the volume 430 of electronic communications 210 between the user 300-1 and the individual/entity 442 and, in some embodiments, other users 300-2 and the individual/entity 442. In specific embodiments of the invention, a weighting 480 of the electronic communications 210 is implemented so as to account for the significance of the electronic communications 210 in terms of type 484, time 482, subject/content 486 and the like. For example, audio/video 218, IM/DM 214 communications may be weighted higher than email 212, more recent communications may be weighted higher than distant communications and communications that task/job-related may be weighted higher than non-task/job related communications.

In additional specific embodiments of the invention, connectedness/trust indicator module 410 is further configured to determine levels of connectedness 440 for various dimensions 442 of the relationship between the user 300-1 and the individual/entity 442. The dimensions 442 may include, but are not limited to, business, personal, client, service, or the like. In such embodiments of the invention, the dimension is determined based on the subject of the electronic communications and/or the contents of the electronic communications. In this regard, one electronic communication may be classified as both business and personal if the content justifies both. In such embodiments of the invention, subsequently multiple indicators 450/470 may be generated to indicate a level of connectedness/trust 440, 460 for each of the different dimensions 442.

In specific embodiments of the invention, connectedness/trust indicator module 410 is further configured to determine a level of trust 460 based at least on the electronic communications 210 and the existence and type (or lack of existence) of security threats 510. In such embodiments of the invention, the same weighting 480 discussed above may be implemented to determine the level of trust 460. In further such embodiments of the invention, one or more levels of trusts 460 may be determined with each level of trust 460 corresponding to a different dimension 442 in the relationship between the user 300-1 and individual/entity 442.

In response to determining the level of connectedness 440 and/or level of trust 460, connectedness/trust indicator module 410 is further configured to generate and present an indicator 450/470 within the email 420 and/or the user's email inbox 310 that indicates the level of connectedness 440 and/or the level of trust 460. As previously discussed, the indicator 450/470 may be a visual indicator, such as a heat map, bar graph, raw score, or the like, or may be configured, by the user, to be an audible indicator. In additional embodiments of the invention, the indicator 450/470 within the email 420 includes an embedded hyperlink 490. In such embodiments of the invention, the user 300-1 may "click-on" the indicator 450/470 to activate the hyperlink 490 to access a dashboard presentation, which provides greater details on how the level of connectedness/trust was determined.

As depicted in FIG. 4, second memory 402 of first computing platform 400 may also store connectedness/trust dashboard application 600 that is configured to provide a user access to information 610 related to level of connectedness 440 including the electronic communications 210 that were considered for determining the level of connectedness 440. Further, the information 610 may include the volume 430, the timing 482, the type 484 of electronic communication 210, the subject/content 486 of the electronic communication 210 and, where applicable, the other users 300-2 associated with the user 300-1 whose electronic communications with the individual/entity were considered for determining the level of connectedness 440.

Connectedness/trust dashboard application 600 is further configured to provide a user access to information 620 related to level of trust 460 including the aforementioned electronic communications 210 that were considered for determining the level of trust 460 and any security threats 510 associated with the email address and/or domain, including the volume 512 of the security threats and the type/nature 514 of the security threats.

As previously discussed, the connectedness/trust dashboard may be configured to be indicator-accessible 630 to the user via a hyperlink 490 embedded in the indicator 450/470. In such embodiments of the invention, the user activates the hyperlink 490 and is presented details 640 as to how the level of connectedness/trust 640 was determined (i.e., so called "deeper-dive" information). In other embodiments of the invention, the connectedness/trust dashboard is accessible to the user via an application or website and is configured to allow for an email address input 650, which, in response, performs a level of connectedness/trust determination 660 and outputs the level of connectedness/trust 440/460 and provides the user access to the information 610/610 related to the level of connectedness/trust 440/460.

Referring to FIG. 5, a flow diagram is depicted of a method 700 for enhancing the security of emails, in accordance with embodiments of the present invention. At Event 710, an email sent by an individual and addressed to a user is received prior to submitting the email to the user's email inbox.

In response to receiving the email, at Event 720, historical electronic communications are accessed to determine, at least, the volume of electronic communications (i) received by the user from the individual/entity and (ii) sent to the individual/entity by the user. The electronic communications may include, but are not limited to, email, IMS/DMs, SMS/texts, audio/video, and the like. In alternate embodiments of the method, the volume of communications between the other users related to the user (e.g., same role/title, same group or enterprise, and the like) and the individual/entity is determined.

In specific optional embodiments of the method, at Event 730, one or more threat monitoring systems/applications are accessed to determine whether the email address or the email domain have known security threats attributed to the individual/entity. For example, the email address or email domain may be known to have been used in the past in attempting to acquire a user's personal information.

In response to determining the electronic communications and, in some embodiments, the security threats, at Event 740, a level of connectedness/trust is determined that the user has with the individual/entity is determined based at least on the determined volume of electronic communications between the user and the individual/entity and, for the level of trust, the existence/non-existence of any security threats. The determination may additionally provide for weighting the electronic communications and/or security threats based on their significance in defining connectedness or trust. The weighting may include type of communication, timing of the communication, subject/content of the communication and the like. Moreover, the level of connectedness/trust may be determined for one or more dimensions in the relationship between the user and individual/entity, such as business, personal, client, service, or the like.

In response to determining the level of connectedness/trust, at Event 750, an indicator is generated and presented within the email and/or the user's inbox that indicates the level of connectedness/trust between the use rand the individual/entity. The indicator may be a visual indicator, such as a heatmap, bar graph, raw score, or the like or the indicator may, as configured by the user, be an audible indicator. Additionally, the indicator may include an embedded link, which, upon activation, provides the user access to a dashboard presentation of details related to the determination of the level of connectedness trust, such as, but not limited to, the electronic communications and security threats considered in making the determinations.

Thus, as described in detail above, present embodiments of the invention include systems, methods, computer program products and/or the like for enhancing the security surrounding emails by providing the user an indicator, such as a visual indicator, within an email or an email inbox that indicates a level of connectedness between the user/recipient and the email sender and/or a level of trust in the email sender (i.e., that the email has been sent from who it purports to be sent from). As such the present invention provides a highly efficient means by which email users can assess their connectedness to the email sender and/or their trust in the email sender before they act on the email and/or the email's contents.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for enhancing the security of electronic mail, the system comprising;
   one or more communication storage apparatus including a first memory and at least one first processing device in communication with the first memory, wherein the first memory is configured to store historical electronic communication sent and received by a plurality of users; and
   a computing platform including a second memory and at least one second processing device in communication with the second memory, wherein the second memory stores:
      a connectedness indicator module, executable by the at least one second processing device and configured to:
         receive an email sent by an individual or entity and addressed to a user from amongst the plurality of users,
         access the first memory of the one or more communication storage apparatus to determine a volume of electronic communication (i) received by the user from the individual or entity and (ii) sent to the individual or entity by the user,
         determine a level of connectedness that the user has to the individual or entity based at least on the determined volume of electronic communication, and
         provide a visual indicator within at least one of (i) the email, and (ii) an electronic mailbox of the user, wherein the visual indicator indicates the level of connectedness that the user has to the individual or entity, and
      a connectedness dashboard application, executable by the one or more second processing devices and configured to:
         provide the user access to a dashboard presentation via a hyperlink embedded in the visual indicator, wherein the dashboard presentation is configured to present information related to electronic communications, wherein the information includes the volume of electronic communications (i) received by the user from the individual or entity and (ii) sent to the individual or entity by the user.

2. The system of claim 1, wherein the connectedness indicator module is further defined as a trust indicator module further configured to:
   access one or more electronic communication threat monitoring applications to determine whether security threats are attributed to the individual or entity that sent the email,
   determine a level of trust that the user has with the individual or entity based at least on the determined (i) volume of electronic communication and (ii) whether security threats are attributed to the individual or entity, and, if security threats are attributed to the individual or entity, a volume and type of the security threats,
   provide the visual indicator within at least one of (i) the email, and (ii) the electronic mailbox of the user that indicates the level of trust that the user has with the individual or entity.

3. The system of claim 1, wherein the first memory of the one or more communication storage apparatus is configured to store the historical electronic communication including at least one selected from the group consisting of email, direct message, Short Messaging Service (SMS)/text message and voice mail.

4. The system of claim 3, wherein the connectedness indicator module is further configured to:
   access the first memory of the one or more communication storage apparatus to determine a volume of the at least one selected from the group consisting of email, direct message, Short Messaging Service (SMS)/text message and voice mail (i) received by the user from the individual or entity and (ii) sent to the individual or entity by the user.

5. The system of claim 2, wherein the connectedness dashboard application is further defined as a trust dashboard application and configured to:
provide the user the dashboard presentation configured to present information related to (i) electronic communications comprising the volume of electronic communication and (ii) the one or more security threats associated with the individual or entity.

6. The system of claim 1, wherein the connectedness indicator module is an application programming interface (API) that connects to an email client.

7. The system of claim 1, wherein the connectedness indicator module is further configured to:
receive, within a header of an email to be sent by the user, an email address associated with a second individual or second entity,
access the first memory of the one or more communication storage apparatus to determine a volume of electronic communication (i) received by the user from the second individual or second entity and (ii) sent to the second individual or second entity by the user,
determine a level of connectedness that the user has to the second individual or second entity based at least on the determined volume of electronic communication, and
provide a second visual indicator within at least one of (i) the email, and (ii) an electronic mailbox of the user, wherein the second visual indicator indicates the level of connectedness that the user has to the second individual or second entity.

8. The system of claim 1, wherein the indicator comprises at least one of a heat map and a bar graph that indicates the level of connectedness that the user has to the individual or entity.

9. The system of claim 1, wherein the connectedness indicator module is further configured to:
assign a weighting value to electronic communications comprising the volume of the electronic communications based at least on one selected from the group consisting of (i) a type of electronic communication, (ii) a time of the electronic communication and (iii) a subject of the electronic communication, and
wherein determining the level of connectedness that the user has to the individual or entity is further based on weighted values assigned to electronic communications comprising the volume of the electronic communications.

10. The system of claim 1, wherein the connectedness indicator module is further configured to:
access the first memory of the one or more communication storage apparatus to determine a volume of electronic communication (iii) received by other users included within the plurality of users from the individual or entity and (iv) sent to the individual or entity by the other users, wherein the other users are defined by at least one selected from the group consisting of (a) having a same role as the user, (b) belonging to a same group as the user, (c) belonging to a same enterprise as the user,
determine the level of connectedness that the user has to the individual or entity based at least on the determined volume of electronic communication (i) received by the user from the individual or entity, (ii) sent to the individual or entity by the user, (iii) received by the other users from the individual or entity and (iv) sent to the individual or entity by the other users.

11. The system of claim 1, wherein the connectedness indicator module is further configured to:
access the first memory of the one or more communication storage apparatus to determine at least one type of communication for each electronic communication in the volume of electronic communications, wherein the types of communication include (i) business, (ii) personal, (iii) client and (iv) service,
determine one or more levels of connectedness that the user has to the individual or entity based at least on the volume of electronic communication (i) received by the user from the individual or entity and (ii) sent to the individual or entity by the user, wherein each of the one or more levels of connectedness are associated with one of the types of communication, and
provide one or more indicators within at least one of (i) the email, and (ii) the electronic mailbox of the user that indicates the level of connectedness that the user has to the individual or entity, wherein each of the one or more indicators is associated with one of the types of communication.

12. A computer-implemented method for enhancing the security of electronic mail, the computer-implemented method is executed by one or more processing devices and comprising;
receiving an email sent by an individual or entity and addressed to a user;
accessing historical electronic communications to determine a volume of electronic communication (i) received by the user from the individual or entity and (ii) sent to the individual or entity by the user;
determining a level of connectedness that the user has to the individual or entity based at least on the determined volume of electronic communication;
providing a visual indicator within at least one of (i) the email, and (ii) an electronic mailbox of the user, wherein the visual indicator indicates the level of connectedness that the user has to the individual or entity; and
providing the user access to a dashboard presentation via a hyperlink embedded in the visual indicator, wherein the dashboard presentation is configured to present information related to electronic communications, wherein the information includes the volume of electronic communications (i) received by the user from the individual or entity and (ii) sent to the individual or entity by the user.

13. The computer-implemented method of claim 12, further comprising:
accessing one or more electronic communication threat monitoring applications to determine whether security threats are attributed to the individual or entity that sent the email;
determining a level of trust that the user has with the individual or entity based at least on the determined (i) volume of electronic communication, and (ii) whether security threats are attributed to the individual or entity, and, if security threats are attributed to the individual or entity, a volume and type of the security threats,
wherein providing the visual indicator further comprises providing the indicator within at least one of (i) the email, and (ii) the electronic mailbox of the user that indicates the level of trust that the user has with the individual or entity.

14. The computer-implemented method of claim 12, further comprising:

accessing the first memory of the one or more communication storage apparatus to determine a volume of electronic communication (iii) received by other users included within the plurality of users from the individual or entity and (iv) sent to the individual or entity by the other users, wherein the other users are defined by at least one selected from the group consisting of (a) having a same role as the user, (b) belonging to a same group as the user, (c) belonging to a same enterprise as the user;

determining the level of connectedness that the user has to the individual or entity based at least on the determined volume of electronic communication (i) received by the user from the individual or entity, (ii) sent to the individual or entity by the user, (iii) received by the other users from the individual or entity and (iv) sent to the individual or entity by the other users.

15. A computer program product including a non-transitory computer-readable medium, the non-transitory computer-readable medium comprising:

a first set of codes for causing a computer to receive an email sent by an individual or entity and addressed to a user;

a second set of codes for causing a computer to access historical electronic communications to determine a volume of electronic communication (i) received by the user from the individual or entity and (ii) sent to the individual or entity by the user;

a third set of codes for causing a computer to determine a level of connectedness that the user has to the individual or entity based at least on the determined volume of electronic communication;

a fourth set of codes for causing a computer to provide a visual indicator within at least one of (i) the email, and (ii) an electronic mailbox of the user, wherein the visual indicator indicates the level of connectedness that the user has to the individual or entity; and a fifth set of codes for causing a computer to provide the user access to a dashboard presentation via a hyperlink embedded in the visual indicator, wherein the dashboard presentation is configured to present information related to electronic communications, wherein the information includes the volume of electronic communications (i) received by the user from the individual or entity and (ii) sent to the individual or entity by the user.

16. The computer program product of claim 15, wherein further comprising:

a sixth set of codes for causing a computer to access one or more electronic communication threat monitoring applications to determine whether security threats are attributed to the individual or entity that sent the email;

a seventh set of codes for causing a computer to determine a level of trust that the user has with the individual or entity based at least on the determined (i) volume of electronic communication, and (ii) whether security threats are attributed to the individual or entity, and, if security threats are attributed to the individual or entity, a volume and type of the security threats, wherein the fourth set of codes is further configured to cause the computer to provide the visual indicator within at least one of (i) the email, and (ii) the electronic mailbox of the user that indicates the level of trust that the user has with the individual or entity.

\* \* \* \* \*